United States Patent
Jonqueres

[19]

[11] Patent Number: 5,921,093
[45] Date of Patent: Jul. 13, 1999

[54] AIR CYCLE ENVIRONMENTAL CONTROL SYSTEM WITH ENERGY REGENERATIVE HIGH PRESSURE WATER CONDENSATION AND EXTRACTION

[75] Inventor: Michel A. Jonqueres, Torrance, Calif.

[73] Assignee: AlliedSignal Inc., Morristown, N.J.

[21] Appl. No.: 09/005,735

[22] Filed: Jan. 12, 1998

Related U.S. Application Data

[60] Provisional application No. 60/052,851, Jul. 11, 1997.

[51] Int. Cl.$^6$ ............................................. F25B 9/00
[52] U.S. Cl. ................................... 62/86; 62/402
[58] Field of Search ..................... 62/87, 402, 86

[56] References Cited

U.S. PATENT DOCUMENTS

| | | |
|---|---|---|
| Re. 32,100 | 4/1986 | Rannenberg . |
| 3,623,332 | 11/1971 | Fernandes .................... 62/87 |
| 4,198,830 | 4/1980 | Campbell . |
| 4,262,495 | 4/1981 | Gupta et al. ................ 62/87 |
| 4,430,867 | 2/1984 | Warner . |
| 4,539,816 | 9/1985 | Fox ............................ 62/402 |
| 4,963,174 | 10/1990 | Payne . |
| 4,966,005 | 10/1990 | Cowell . |
| 4,967,565 | 11/1990 | Thomson . |
| 5,086,622 | 2/1992 | Warner . |

FOREIGN PATENT DOCUMENTS

| | | |
|---|---|---|
| 1390698 | 1/1965 | France . |
| 2 486 210 | 1/1982 | France . |
| 2 027 874 | 2/1980 | United Kingdom . |
| WO 91/00483 | 1/1991 | WIPO . |
| WO 92/03338 | 3/1992 | WIPO . |

*Primary Examiner*—Ronald Capossela
*Attorney, Agent, or Firm*—Robert Desmond, Esq

[57] ABSTRACT

An air cycle environmental control system regenerates energy through the provision of a reheater condenser that condenses water vapor from compressed air. The condensed water vapor is extracted by a water extractor to produce dehumidified air. A subcooler heat exchanger can receive the dehumidified air for further cooling, but while causing a minimal amount of condensation. A subcooled air from the subcooler heat exchanger is then reheated in the reheater condenser, with a resulting reheated air having absorbed a heat of sensible cooling and heat of condensation. The reheated air then passes into a turbine where the heat of sensible cooling and heat of condensation are recovered. The turbine expands the air, which then flows through the subcooler heat exchanger and finally to an enclosure to be conditioned.

27 Claims, 1 Drawing Sheet

AIR CYCLE ENVIRONMENTAL CONTROL SYSTEM WITH ENERGY REGENERATIVE HIGH PRESSURE WATER CONDENSATION AND EXTRACTION

This application claims priority Under 35 USC Section 119 to provisional application Ser. No. 60/052,851 filed Jul. 11, 1997.

BACKGROUND OF THE INVENTION

The present invention generally relates to air cycle Environmental Control Systems (ECSs) and, more specifically, to an improved air cycle ECS and improved method of conditioning water vapor bearing air while minimizing energy losses that might otherwise occur during water vapor removal.

ECSs are used to provide a supply of conditioned air to an enclosure, such as an aircraft cabin and cockpit. An air cycle ECS typically operates on a flow of bleed air taken from an intermediate or high pressure stage within a jet engine having multi-compression stages or from an auxiliary power unit (APU) having a compressor specifically designed as a source of compressed air to the aircraft air conditioning system. All air compressed by the engine or APU is initially ambient air which may contain substantial amounts of moisture while operating at low altitudes. One important function of the ECS is to remove most of that moisture that would otherwise condense and be supplied as unwanted liquid droplets in the cool supply of conditioned air to the cabin.

Two main ECS types have been used recently and are considered state of the art for an efficient air cycle ECS. These are the 3 wheel and 4 wheel high pressure water separation (HPWS) systems. The reference to 3 wheels relates to the fact that three rotating aerodynamic impellers (namely, a turbine, a compressor and a fan) are tied to one another by a common drive shaft. The bleed air is usually pre-cooled within a primary heat exchanger where the heat is rejected to ambient air, and then flowed to the compressor. The fan moves the ambient air through the heat exchanger while the aircraft is on the ground and no air speed is available to push the air through such exchanger. Because water is removed before the air flow reaches the turbine, the flow is at a relatively high pressure created by the compressor. Hence, the term "high pressure water separation" is used.

Typically following compression in the 3 wheel HPWS system, an ambient air secondary heat exchanger, a reheater, and a condenser are employed for air cooling and water condensation. The secondary ambient air heat exchanger cools the air back to near ambient temperature. Next, the reheater further cools the air and the condenser then completes the cooling process. In the condenser, a temperature is reached where most of the water content has to condense into a liquid form. At a typical design condition for the system, about 69% of the total water content in the bleed air stream exits the condenser in liquid form. Some prior condensation takes place in the secondary heat exchanger and the reheater (which is usually about 20 to 30 degrees F higher than in the condenser). But the amount of condensation in the reheater is significantly less than what occurs in the condenser, and represents less than about 30% of the overall condensation achieved by the system. In fact, condensation is only incidental to the primary goal of the reheater which is to bring the temperature and energy level back up at the turbine inlet after it has been reduced to condense the water.

After final condensation in the condenser, the liquid water is removed by a water extractor. Typically, about 85 to 95% of the liquid water is removed, leaving an essentially dehumidified air containing from about 5 to not more than about 42 grains of total water content (vapor and liquid) per pound of dry air. The resulting dehumidified air flows to the reheater where it cools the incoming moisture laden bleed air and, in turn, the dehumidified air is reheated. The reheated dehumidified air, which contains essentially no liquid moisture, is then supplied to the turbine for expansion and cooling. A cool, expanded air from the turbine is then flowed into the condenser where the incoming moisture laden bleed air is cooled. In turn, the cool expanded air absorbs a heat load equal to the heat of condensation removed from the moist bleed air and the sensible cooling load corresponding to the temperature reduction imparted to the bleed air while in heat exchange in the condenser. The air from the turbine, which has now been warmed in the condenser, is then directly supplied to the cabin.

A feature of the current 3 wheel HPWS system is that the reheater is used to recover part of the cooling load necessary for water condensation. Thereby, the turbine can transform the extra energy represented by the combined pressure and temperature of the incoming dehumidified air into mechanical energy (i.e., shaft power), and can deliver air at lower pressure and temperature. As air at higher temperature is input to the turbine, the thermodynamic laws of expansion dictate that a larger temperature drop occurs in the turbine, as well as more turbine power. This extra cooling and mechanical power represent a partial "recovery" of the heat energy added to the flow in the reheater that is not passed on to the cabin.

The recovery is, in fact, only minimal in the 3 wheel HPWS because there is only a partial amount of condensation that occurs in the reheater. The majority of the energy related to the water condensation process is exchanged in the condenser and is not returned to the turbine for recovery. Instead, such non-recovered energy finds its way directly into the cabin in the form of higher supply temperature. At a typical design operating point for the 3 wheel HPWS system, only about 12% of the water condensation energy is recovered in the form of mechanical energy. That means that about 88% of the energy removed from the wet bleed air for the purpose of water removal results in an increase of the air temperature supplied to cool the enclosure.

In a 4 wheel HPWS system, a second turbine (i.e., the fourth wheel) is added downstream of the condenser. With both the 3 and 4 wheel systems, the dehumidified air leaving the condenser contains extra heat exchanged in the condensing process. In the 4 wheel system, instead of adding entirely to the cabin supply temperature, that extra heat provides a higher energy level to the air entering the second turbine, and partial recovery of that energy can take place in the second turbine. At typical turbine pressure ratios and efficiencies, the 4 wheel system is more energy efficient than the above 3 wheel system but requires more complex rotating equipment—namely, 4 wheels. The 4 wheel system also requires a larger condenser because temperature from the first turbine is higher relative to the turbine in a 3 wheel system. The temperature difference is primarily due to the fact that the first turbine is limited to expanding only a portion of the available pressure ratio from compressor to cabin so that enough pressure is left over for expansion by the second turbine. The temperature difference is also because the first turbine output is typically kept under freezing levels.

Despite the advantages in the prior 3 and 4 wheel HPWS designs, they still have disadvantages, particularly in terms of energy losses in the water removal process. More specifically, the past designs allow a significant amount of water condensation energy to be added in the form of heat to the air supply to the enclosure. That forces the system to be oversized to overcome the unrecovered water processing heat load. Of course, reducing such energy losses would result in greater cycle efficiency. With greater efficiency, the ECS could provide more cooling capacity for a given ECS unit size. Or, a smaller sized ECS unit could be installed to condition a given load.

As can been seen, there is a need for an improved 3 wheel ECS and improved method for high pressure water condensation and extraction in a 3 wheel ECS, both of which increase efficiency. Specifically, there is a need to minimize energy losses incurred in the water condensation and removal process of an ECS. In particular, there is a need for an ECS to reduce the amount of water condensation energy that is added in the form of heat to the supply stream to the enclosure. There is a further need for an ECS and method of condensation that provides more cooling capacity for a given sized system, or a smaller sized system for a given load. There is an additional need for an ECS and method of conditioning air which minimizes the mechanical complexity of the system, such as the use of a 4 wheel machine.

SUMMARY OF THE INVENTION

The present invention is directed to an improved ECS with enhanced capability of energy regenerative high pressure water condensation and extraction. The invention is also directed at providing the benefits of relatively high condensing energy recovery within an air cycle implemented with a simple mechanical design where the turbomachinery only requires a single turbine. The system comprises a reheater condenser capable of placing compressed air in heat exchange relationship with a first coolant medium, with the reheater condenser being for the production of dehumidified air; a subcooler heat exchanger in flow communication with the reheater condenser, and the subcooler heat exchanger capable of cooling the dehumidified air to thereby produce a subcooled air which can act as the first coolant medium in the reheater condenser; a single turbine in flow communication with the reheater condenser and the subcooler heat exchanger, with the turbine capable of receiving and expanding the subcooled and reheated air to thereby produce an expanded air, and the expanded air being capable of acting as a second coolant medium in the subcooler heat exchanger and as eventual supply to the enclosure.

The invention is also directed to an improved method of conditioning water vapor bearing compressed air while minimizing energy losses during water removal. Such method comprises the steps of condensing water vapor from compressed air in a reheater condenser such that the compressed air can become dehumidified air; cooling the dehumidified air in a subcooler heat exchanger such that the dehumidified air becomes a subcooled air; absorbing a heat of sensible cooling and a heat of condensation by the subcooled air in the reheater condenser; and expanding the subcooled air in a turbine after the step of absorbing heat.

These and other features, aspects, and advantages of the present invention will become better understood with reference to the following drawings, description, and claims.

DETAILED DESCRIPTION OF THE INVENTION

Figure 1:
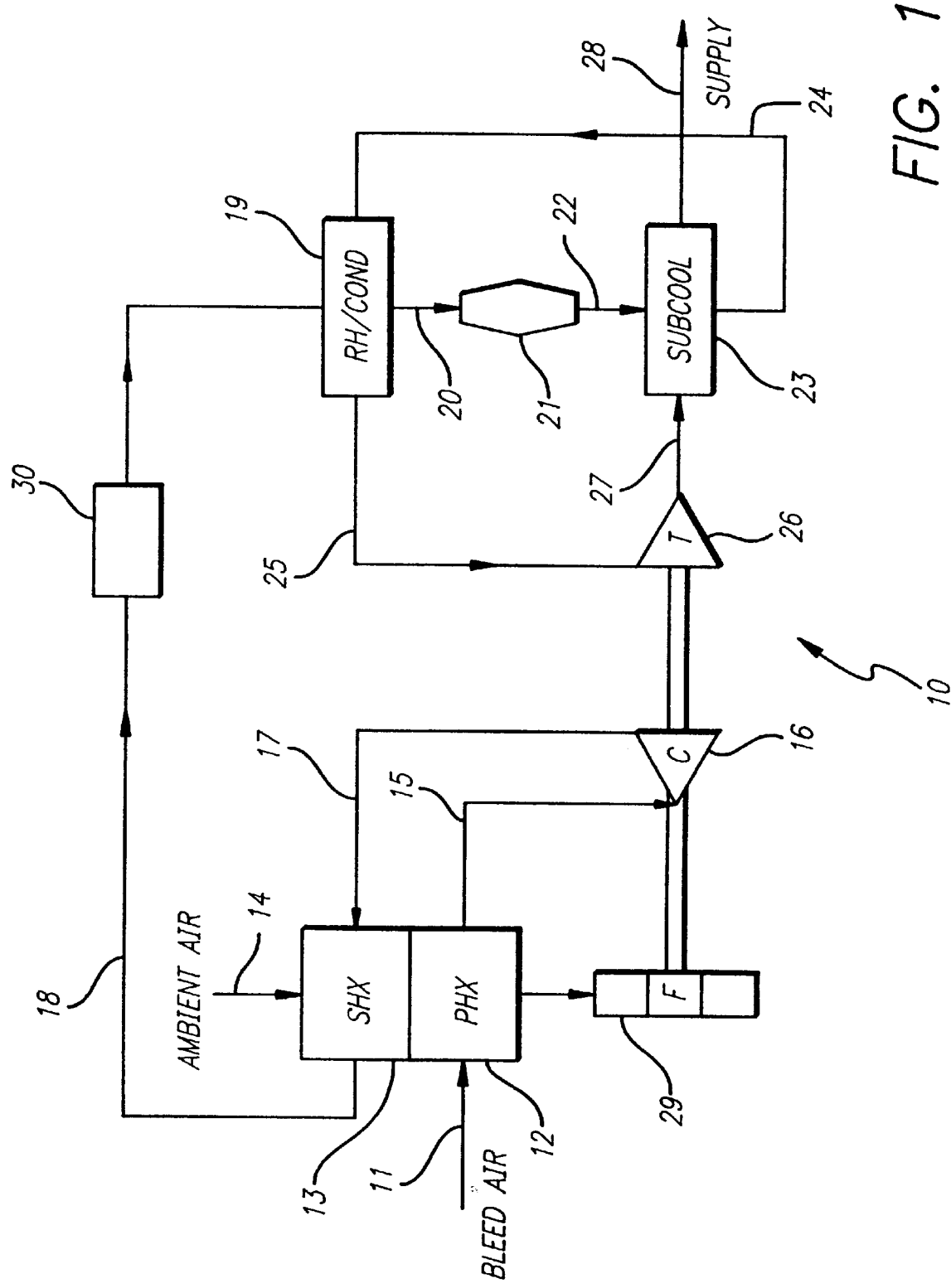
FIG. 1 is a schematic diagram of one embodiment of an environmental control system according to the present invention.

FIG. 1 schematically shows one embodiment of an air cycle, 3 wheel environmental control system 10 according to the present invention. The system 10 generally operates by receiving a bleed air stream 11 to be conditioned for eventual supply to an enclosure, such as the cabin of an aircraft. The conditioning of the air 11 includes removing water vapor and lowering the temperature. In the context of an aircraft, the bleed air 11 comes from a turbine engine. The system 10 is designed for condensing most or substantially all of the water vapor from the bleed air 11 in a reheater condenser 19. Further cooling of the air then occurs in a subcooler heat exchanger 23 in the substantial absence of condensation, i.e., only a minimal amount of condensation occurs. The air is then returned to the reheater condenser 19 and then expanded by a turbine 26. From the turbine 26, the air returns to the subcooler 23 and then exits as a supply 28 to the cabin of the aircraft. However, even though the present invention is described in the context of an aircraft, it is contemplated that many different environments can incorporate the system 10, such as buses and other ground vehicles where a source of compressed air is available.

In more particularly describing a preferred embodiment of the present invention, the bleed air 11 is pre-cooled in a primary heat exchanger 12. As known in the art, if the bleed air 11 is from an aircraft turbine engine, the humidity and temperature of the air 11 can vary widely, and commonly encountered humidity may range from about 0 to 100% while temperatures may range from about 200 to 450 degrees F. The primary heat exchanger 12 places in heat exchange relationship a source of ambient air 14 and the bleed air 11, while a fan 29 draws the ambient air 14 carrying the excess heat received during the heat exchange process. In so doing, the primary heat exchanger 12 can produce a pre-cooled air which passes into a duct 15. The pre-cooled air then enters a compressor 16 to compress the pre-cooled air to a high pressure. While the amount of compression can vary depending upon the particular environment for the system 10, it is contemplated that the pressure range for this embodiment of the invention is about 60 to 80 psia. Thereby, a compressed or high pressure air exits the compressor 16, flows through a duct 17 and enters a secondary heat exchanger 13.

The secondary heat exchanger 13 cools the high pressure or compressed air back to near ambient temperature levels. The heat exchanger 13 removes the heat added during the compression process by placing the compressed air in heat exchange relationship with the ambient air 14. A high pressure or compressed, cooled air exits the secondary heat exchanger 13 and enters a duct 18. At this point, the high pressure, cooled air is still laden with the water vapor which entered the system 10. However, a limited amount (up to about 30% in this embodiment) of water vapor may have already condensed due to the temperature reduction in the secondary heat exchanger 13. For example, in this embodiment, if the air entering the heat exchanger 13 contains about 133 gr/lb of moisture in vapor form, then when exiting the heat exchanger 13 the air may contain about 103 gr/lb in vapor form and about 30 gr/lb in liquid form. A portion of that liquid water may optionally be removed by a water extractor 30 prior to entering the reheater condenser 19.

The reheater condenser 19 further condenses the water vapor contained in the high pressure or compressed, cooled air. The condensation occurs through a heat exchange relationship between the compressed, cooled air and a coolant medium which comprises a flow downstream of the subcooler 23, as further described below. The heat exchange in the reheater condenser 19 lowers the temperature of the high pressure air by about 20 to 30 degrees F, in this embodiment, to a point where a substantial amount of water can no longer remain in vapor phase and condenses as a liquid. It is a specific feature of this invention that the reheater condenser 19 is the primary water vapor condensation means in the system 10. In other words, the reheater condenser 19 is where most or substantially all of the intended water condensation occurs in the system 10. In this embodiment, for example, about 55 to 75% of the total water vapor in the compressed, bleed air is condensed in the condenser 19. Of course, the amount of condensation in the reheater condenser 19 can vary with the particular requirements of the enclosure or environment to be supplied.

Upon the reheater condenser 19 condensing the water vapor, a condensed water and air flow is created which contains a substantial amount of liquid water but which can become dehumidified air by mechanically removing the liquid water. The condensed water/air flow moves through a duct 20 and into a water extractor 21 where the condensed water is substantially removed. Usefully, more than about 80% of the water is removed and, more preferably, about 90 to 95% is removed. Such water removal thus produces a dehumidified air having a total water content of not more than about 5 to 42 gr/lb in this embodiment of the invention. Nevertheless, the total water content of the dehumidified air can vary depending upon the sizing requirements and the environment of the system 10. The dehumidified air leaves the water extractor 21 through a duct 22. The subcooler 23 then receives the dehumidified air for additional cooling.

The subcooler heat exchanger 23 also uses heat exchange for a primary function of cooling the dehumidified air. The subcooler 23 does so by using as a coolant medium a flow downstream of the turbine 26, which is further described below. A primary function of the subcooler 23 is not to condense water, unlike the reheater condenser 19. That is due to the fact that the dehumidified air entering the subcooler 23 has already gone through substantial condensation and water extraction by the time the air reaches the subcooler 23. As such, when a further lowering of the dehumidified air temperature occurs in the subcooler 23, only a relatively small, additional reduction of the water vapor content occurs through condensation. In this embodiment, not more than about 20% of the initial water content in the bleed air 13 condenses in the subcooler 23, although the amount of condensation may vary for the environment. Moreover, in comparison to the amount of condensation that occurs in the reheater condenser 19, the condensation that may occur in the subcooler 23 is of a substantially reduced or incidental, minor amount. With the reheater condenser 19 being considered the means for primary water condensation, the subcooler 23 can thus be described as a means for incidental or secondary water condensation.

A subcooled air from the subcooler 23 flows through a duct 24 to enter the reheater condenser 19. Therein, the subcooled air acts as a coolant medium when it is placed in heat exchange relationship with the compressed, cooled air from the secondary heat exchanger 13. Consequently, the subcooled air absorbs a heat of sensible cooling and a heat of condensation given off from the compressed, moisture bearing cooled air in the reheater condenser 19. Therefore, the subcooled air is reheated in the reheater condenser 19 and is delivered to the turbine 26 at an increased temperature. As the air is reheated, the system 10 is designed so that essentially all water remaining in liquid form evaporates and a dry airstream can be delivered to the turbine 26 inlet.

The reheated air exits the reheater condenser 19 through a duct 25. Since the reheated air contains the absorbed sensible heat and condensation heat, the totality of the absorbed heat still remains available for recovery and conversion into useful mechanical energy. In this embodiment, recovery occurs when the reheated air is flowed into the turbine 26 and the reheated air is expanded. By so doing, the absorbed sensible heat and condensation heat is used by the turbine 26, for example, to increase its rotating speed, boost its pressure ratio, and increase the expansion of the reheated air. In addition to the recovery of sensible heat and condensation energy, the turbine 26 cools the reheated air when it is expanded and, thus, provides a cooler air supply. As an example, with a given a temperature of about 105 degree F for the reheated air, an expanded air exits the turbine at about −25 degrees F in this embodiment.

The expanded air from the turbine 26 flows through a duct 27 to enter the subcooler heat exchanger 23. In the subcooler 23, the expanded air serves as a coolant medium when placed in heat exchange relationship with the dehumidified air. From such heat exchange relationship, the expanded air is warmed to a temperature of about 20 degrees F in this embodiment. It is an object of the present invention that this added heat load, and resulting air supply increase in temperature, is minimized by effecting a majority of the condensation in the reheater condenser 19 rather than the subcooler 23. After warming, the air exits the subcooler 23 as conditioned air or the supply 28. In turn, the supply 28 can be flowed to the enclosure to be conditioned.

It can be seen from FIG. 1 that the present invention includes the step of pre-cooling the bleed air 11 and then compressing it to a high pressure. The next step includes condensing water vapor from the compressed or high pressure, cooled air, with most or a majority of the condensing occurring in the reheater condenser 19. The reheater condenser 19 thus produces an air flow containing condensed water which can eventually become dehumidified air. A step of extracting condensed water next occurs when the condensed water/air flow moves through the water extractor. Upon extraction of the condensed water, the dehumidified air is produced. The dehumidified air is subsequently routed through the subcooler 23 for additional cooling, but with only a minor or minimal amount of water condensation, since such condensation has already occurred to a substantial extent in the reheater condenser 19. The subcooled air produced by the subcooler heat exchanger 23 is returned to the reheater condenser 19 such that the subcooled air is in heat exchange relationship with the compressed, cooled air. Thereby, the system 10 includes a step of absorbing a majority (i.e., for example, about 75% in this embodiment) of the energy of sensible cooling and of condensation removed from the water in the reheater condenser 19. The reheated air from the reheater condenser 19, which carries the absorbed heat, is then expanded in the turbine 26. In so doing, the absorbed heat is recovered by the turbine 26 and transformed into useful mechanical energy, rather than allowing such absorbed heat to be simply added to the supply 28. The expanded air from the turbine 26 is then placed in heat exchange relationship with the dehumidified air, warmed to a minimum extent in the subcooler 23, and then routed to the enclosure or cabin.

As can be appreciated by those skilled in the art, the present invention increases operating efficiency of an air cycle ECS by minimizing the energy loss during water condensation and removal. This is accomplished by absorbing a majority of the heat of sensible cooling and heat of condensation in the reheater condenser 19 and recovering it. Instead of allowing the absorbed heat to be lost to the supply stream, the present invention transforms the absorbed heat into energy that can increase the speed of the turbine 26, which results in greater air expansion. At the same time, the compressor 16, which is mechanically tied to the turbine 26 by a common shaft, receives more energy for compression. Similarly, the fan 29, which also shares the common shaft, can use the increased power and move a larger cooling air flow through the heat exchangers 11, 13. The result is that the supply 28 can be cooler and have a greater cooling capacity. Alternatively, the needed amount of ambient air 14 could be reduced, as well as the size of the primary and secondary heat exchangers 11, 13, while delivering a given cooling capacity.

More specifically, when compared to prior 3 wheel HPWS system designs, the present invention recovers a larger portion of the condensation energy. In the one embodiment disclosed above, the present invention recovers about 21% of the total condensation energy. On the other hand, and as mentioned above, prior 3 wheel HPWS systems only recover about 12%. The increased recovery achieved by the present invention is possible because about 75% of the heat of condensation, in the above embodiment, is directed to the inlet of the turbine 26 to be partially recovered. In contrast, less than about 40% is directed to the turbine in prior 3 wheel systems. The present invention also involves a simpler implementation when compared to the prior 4 wheel HPWS system, since there are only 3 wheels instead of 4.

It should be understood, of course, that the foregoing relates to preferred embodiments of the invention and that modifications may be made without departing from the spirit and scope of the invention as set forth in the following claims.

We claim:

1. A method for conditioning water vapor bearing compressed air for supply as conditioned air to an enclosure, comprising the steps of:
    condensing water vapor from said compressed air in a reheater condenser such that said compressed air can become a dehumidified air;
    cooling said dehumidified air in a subcooler heat exchanger such that said dehumidified air becomes a subcooled air;
    absorbing a heat of sensible cooling and a heat of condensation by said subcooled air in said reheater condenser; and
    routing said subcooled air through a turbine for supply to said enclosure.

2. The method of claim 1, wherein the step of routing said subcooled air through said turbine occurs after the step of absorbing heat.

3. The method of claim 1, further comprising the step of routing said subcooled air to said reheater condenser.

4. The method of claim 1, further comprising the step of placing in heat exchange relationship said water vapor bearing compressed air and said subcooled air, the step of placing in heat exchange relationship occurring in said reheater condenser.

5. The method of claim 1, further comprising the step of placing in heat exchange relationship said dehumidified air and an expanded air from said turbine, the step of placing in heat exchange relationship occurring in said subcooler heat exchanger.

6. The method of claim 1, further comprising the step of extracting condensed water vapor from said compressed air.

7. A method for conditioning water vapor bearing compressed air for supply as conditioned air to an enclosure, comprising the steps of:
    condensing a majority of said water vapor from said compressed air in a reheater condenser to produce condensed water;
    extracting said condensed water to produce a dehumidified air; and
    cooling said dehumidified air in a subcooler heat exchanger such that said dehumidified air becomes a subcooled air.

8. The method of claim 7, further comprising the step of routing said subcooled air to said reheater condenser.

9. The method of claim 7, further comprising the step of absorbing a heat of sensible cooling and a heat of condensation by said subcooled air in said reheater condenser.

10. The method of claim 7, wherein said subcooled air acts as a coolant medium in said reheater condenser.

11. The method of claim 7, wherein the step of extracting condensed water occurs after the step of condensing in said reheater condenser and prior to the step of cooling in said subcooler heat exchanger.

12. The method of claim 7, further comprising the step of reducing an addition of heat to said supply by expanding said subcooled air.

13. The method of claim 12, wherein the step of reducing an addition of heat comprises a step of routing said subcooled air through a turbine.

14. The method of claim 13, wherein said turbine provides an expanded air which acts as a coolant medium in said subcooler heat exchanger.

15. The method of claim 14, further comprising the step of placing in heat exchange relationship said expanded air and said dehumidified air in said subcooler heat exchanger.

16. An air cycle environmental control system for conditioning water vapor bearing compressed air for supply to an enclosure as conditioned air, comprising:
    a reheater condenser capable of condensing a majority of said water vapor;
    a subcooler heat exchanger in flow communication with said reheater condenser, said subcooler heat exchanger being capable of cooling a dehumidified air to thereby produce a subcooled air;
    a water extractor in flow communication with and intermediate of said reheater condenser and said subcooler heat exchanger; and
    a turbine in flow communication with and intermediate of said reheater condenser and said subcooler heat exchanger.

17. The system of claim 16, wherein said subcooler heat exchanger is disposed downstream of said reheater condenser and said water extractor.

18. The system of claim 16, wherein said turbine is disposed downstream of said reheater condenser.

19. The system of claim 16, wherein said reheater condenser can place in heat exchange relationship said compressed air and a subcooled air from said subcooler heat exchanger.

20. The system of claim 16, wherein said subcooler heat exchanger can place in heat exchange relationship said dehumidified air and an expanded air from said turbine.

21. An air cycle environmental control system for conditioning water vapor bearing compressed air for supply to an enclosure as conditioned air, comprising:
    a reheater condenser capable of condensing water vapor from said compressed air and capable of absorbing a heat of condensation;

a water extractor in flow communication with and downstream of said reheater condenser, said water extractor being capable of producing a dehumidified air from said compressed air;

a subcooler heat exchanger in flow communication with and downstream of said water extractor, said subcooler heat exchanger being capable of cooling said dehumidified air with only an incidental amount of water vapor condensation to thereby produce a subcooled air; and a turbine in flow communication with and intermediate of said reheater condenser and said subcooler heat exchanger.

22. The system of claim 21, wherein said reheater condenser is capable of condensing a majority of said water vapor.

23. The system of claim 22 wherein said reheater condenser can enable said subcooled air to absorb a heat of sensible cooling and a heat of condensation from said compressed air.

24. The system of claim 21, wherein said subcooler heat exchanger can place in heat exchange relationship said dehumidified air and an expanded air from said turbine.

25. The system of claim 21, wherein said turbine can recover a heat of sensible cooling and a heat of condensation in a reheated air from said reheater condenser.

26. The system of claim 21, further comprising a heat exchanger that can receive said compressed air, said heat exchanger being in flow communication with and upstream of said reheater condenser.

27. The system of claim 26, further comprising a compressor that can compress a bleed air and supply it to said heat exchanger.

* * * * *